United States Patent
Schweitzer et al.

(10) Patent No.: US 9,949,427 B2
(45) Date of Patent: Apr. 24, 2018

(54) SYSTEM AND METHOD OF DISTRIBUTING SEEDS AND AGRICULTURAL PARTICLES

(71) Applicant: Deere & Company, Moline, IL (US)

(72) Inventors: John M. Schweitzer, Ankeny, IA (US); Peter R. Nedved, Coal Valley, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/871,633

(22) Filed: Sep. 30, 2015

(65) Prior Publication Data

US 2017/0086356 A1     Mar. 30, 2017

(51) Int. Cl.

| A01C 7/20 | (2006.01) |
|---|---|
| A01C 7/10 | (2006.01) |
| A01C 5/06 | (2006.01) |
| A01C 7/04 | (2006.01) |
| A01C 7/08 | (2006.01) |

(52) U.S. Cl.
CPC ............... *A01C 7/102* (2013.01); *A01C 5/062* (2013.01); *A01C 5/068* (2013.01); *A01C 7/042* (2013.01); *A01C 7/081* (2013.01); *A01C 7/082* (2013.01)

(58) Field of Classification Search
CPC ........... A01C 7/10; A01C 7/102; A01C 7/105; A01C 7/107; A01C 21/005
USPC .................................................. 111/174–177
See application file for complete search history.

(56) References Cited

U.S. PATENT DOCUMENTS

| 4,638,748 A | 1/1987 | Kopecky |
| 4,779,765 A | 10/1988 | Neumeyer |
| 5,351,635 A | 10/1994 | Hulicsko |
| 5,650,609 A | 7/1997 | Mertins |
| 5,826,523 A | 10/1998 | Gregor |
| 6,192,813 B1 * | 2/2001 | Memory ................ A01C 7/081 111/176 |
| 6,688,244 B1 | 2/2004 | Meyer et al. |
| 6,935,255 B2 | 8/2005 | Hagen et al. |
| 7,353,760 B2 * | 4/2008 | Mayerle ................... A01C 7/06 111/175 |
| 7,509,915 B2 | 3/2009 | Memory |
| 7,555,990 B2 | 7/2009 | Beaujot |

(Continued)

FOREIGN PATENT DOCUMENTS

| CA | 2741267 | 11/2012 |
| EP | 2196079 | 6/2010 |

(Continued)

OTHER PUBLICATIONS

Office Action from the US Patent and Trademark Office for U.S. Appl. No. 14/871,515 dated Jan. 27, 2017 (13 pages).

(Continued)

*Primary Examiner* — John Weiss

(74) *Attorney, Agent, or Firm* — Michael Best & Friedrich LLP

(57) ABSTRACT

A system for distributing a plurality of seeds includes a storage tank operable to store the plurality of seeds. A first meter is downstream of the storage tank. A second meter is downstream of the first meter and is operable to individually meter the plurality of seeds. An outlet conduit is located downstream of the second meter. The first meter is configured to adjust the flow of the plurality of seeds in response to a signal from a sensor located between the first meter and the outlet conduit.

18 Claims, 10 Drawing Sheets

(56) References Cited

U.S. PATENT DOCUMENTS

| | | |
|---|---|---|
| 7,765,943 B2 | 8/2010 | Landphair |
| 7,938,075 B1 | 5/2011 | Glendenning et al. |
| 8,132,521 B2 | 3/2012 | Snipes et al. |
| 8,281,724 B2 * | 10/2012 | Snipes .................. A01C 7/102 111/178 |
| 8,350,689 B2 | 1/2013 | Mariman et al. |
| 8,666,608 B2 | 3/2014 | Friggstad |
| 9,043,949 B2 * | 6/2015 | Liu ....................... A01C 7/081 |
| 9,488,512 B2 * | 11/2016 | Hossain .................... G01F 1/88 |
| 9,596,803 B2 * | 3/2017 | Wendte ................ A01C 21/005 |
| 9,699,953 B2 | 7/2017 | Jagow et al. |
| 2003/0133759 A1 | 7/2003 | Winther |
| 2007/0266917 A1 | 11/2007 | Riewerts et al. |
| 2009/0079624 A1 | 3/2009 | Dean et al. |
| 2012/0226461 A1 * | 9/2012 | Kowalchuk ........... A01C 7/107 702/100 |
| 2014/0165890 A1 * | 6/2014 | Graham .................. A01C 7/04 111/170 |
| 2014/0216314 A1 | 8/2014 | Bourgault et al. |
| 2014/0311598 A1 | 10/2014 | Hui et al. |
| 2015/0090166 A1 | 4/2015 | Allgaier et al. |
| 2015/0223392 A1 * | 8/2015 | Wilhelmi ................ A01C 7/20 111/171 |
| 2016/0037713 A1 * | 2/2016 | Wendte ............... A01C 21/005 111/177 |
| 2016/0095274 A1 * | 4/2016 | Wendte ............... A01C 21/005 111/177 |
| 2016/0120107 A1 * | 5/2016 | Chahley ................ A01C 7/107 406/29 |
| 2016/0121284 A1 * | 5/2016 | Roberge ................ F16K 31/602 366/151.1 |
| 2016/0135359 A1 * | 5/2016 | Kowalchuk ........... A01C 7/105 111/149 |
| 2016/0157417 A1 | 6/2016 | Funck |
| 2016/0234996 A1 | 8/2016 | Sauder et al. |
| 2016/0295792 A1 | 10/2016 | Secrest et al. |
| 2016/0302353 A1 | 10/2016 | Wendte et al. |
| 2017/0086351 A1 | 3/2017 | Garner et al. |
| 2017/0086352 A1 | 3/2017 | Frasier et al. |
| 2017/0127605 A1 | 5/2017 | Roberge et al. |
| 2017/0156259 A1 | 6/2017 | Barsi et al. |

FOREIGN PATENT DOCUMENTS

| | | |
|---|---|---|
| EP | 2765398 | 8/2014 |
| EP | 3000299 | 3/2016 |
| EP | 3235361 | 10/2017 |
| FR | 2973790 | 10/2012 |
| SU | 759063 | 8/1980 |
| WO | 2015094108 | 6/2015 |

OTHER PUBLICATIONS

Office Action from the US Patent and Trademark Office for U.S. Appl. No. 14/871,653 dated Jan. 31, 2017 (13 pages).
EP16190733.2 Extended European Search Report dated Feb. 2, 2017 (9 pages).
Office Action from the US Patent and Trademark Office for U.S. Appl. No. 14/871,515 dated May 10, 2017 (5 pages).
Office Action from the US Patent and Trademark Office for U.S. Appl. No. 14/871,653 dated Jul. 17, 2017 (5 pages).
Office Action from the US Patent and Trademark Office for U.S. Appl. No. 14/871,515 dated Oct. 24, 2017 (13 pages).
Office Action from the US Patent and Trademark Office for U.S. Appl. No. 15/290,345 dated Jan. 17, 2018 (12 pages).

* cited by examiner

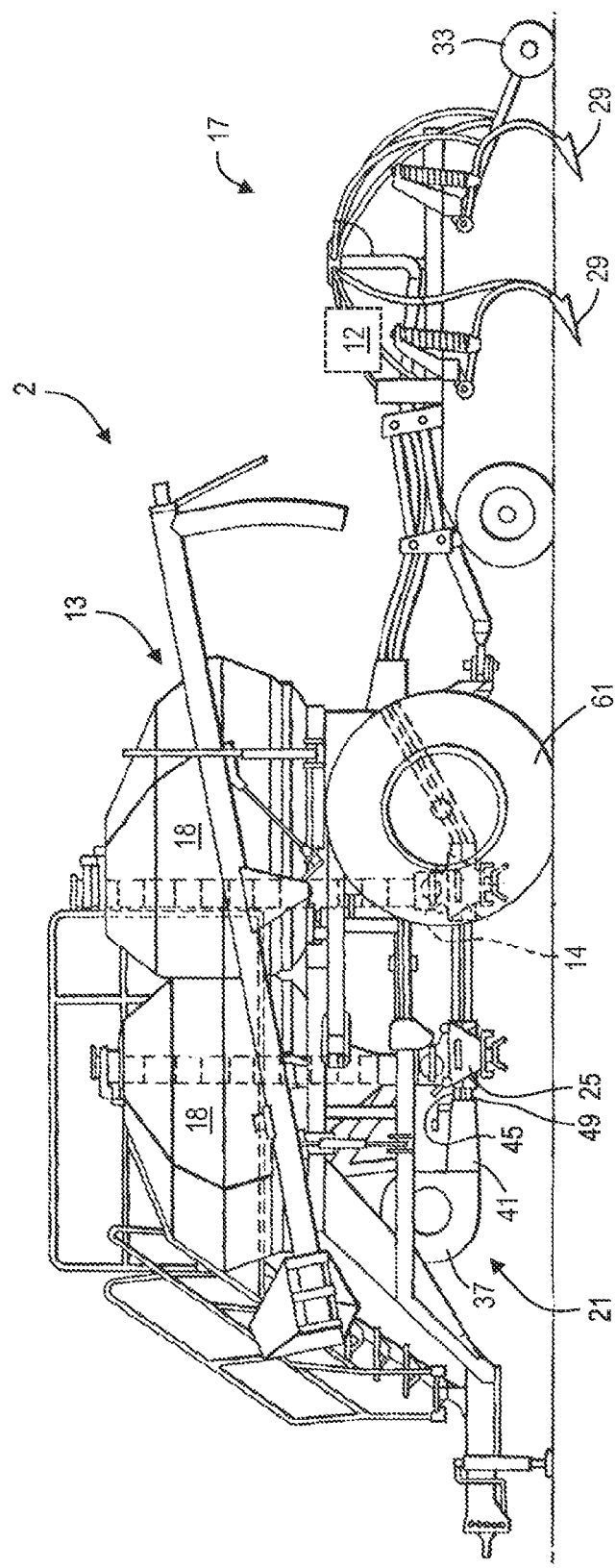

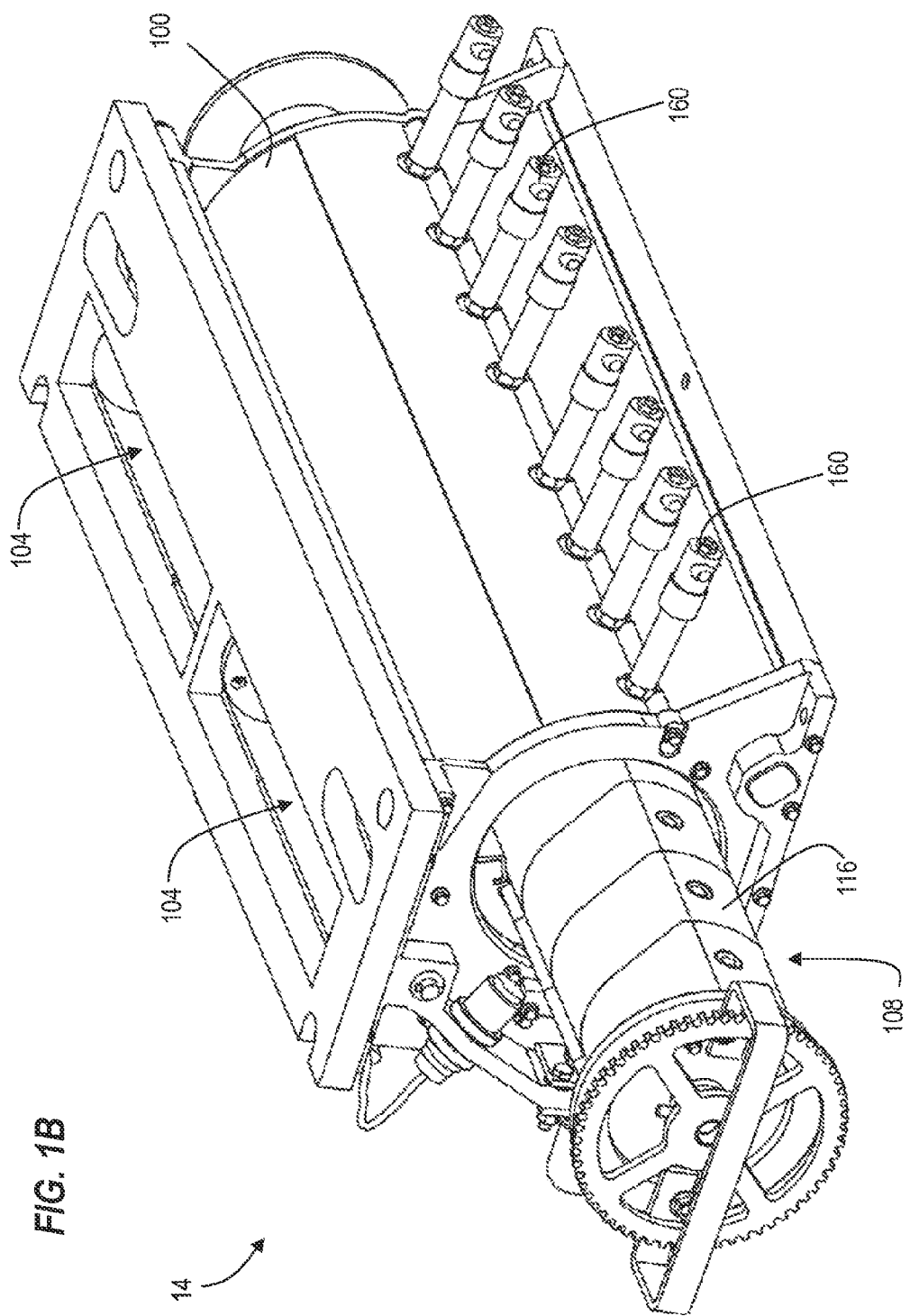

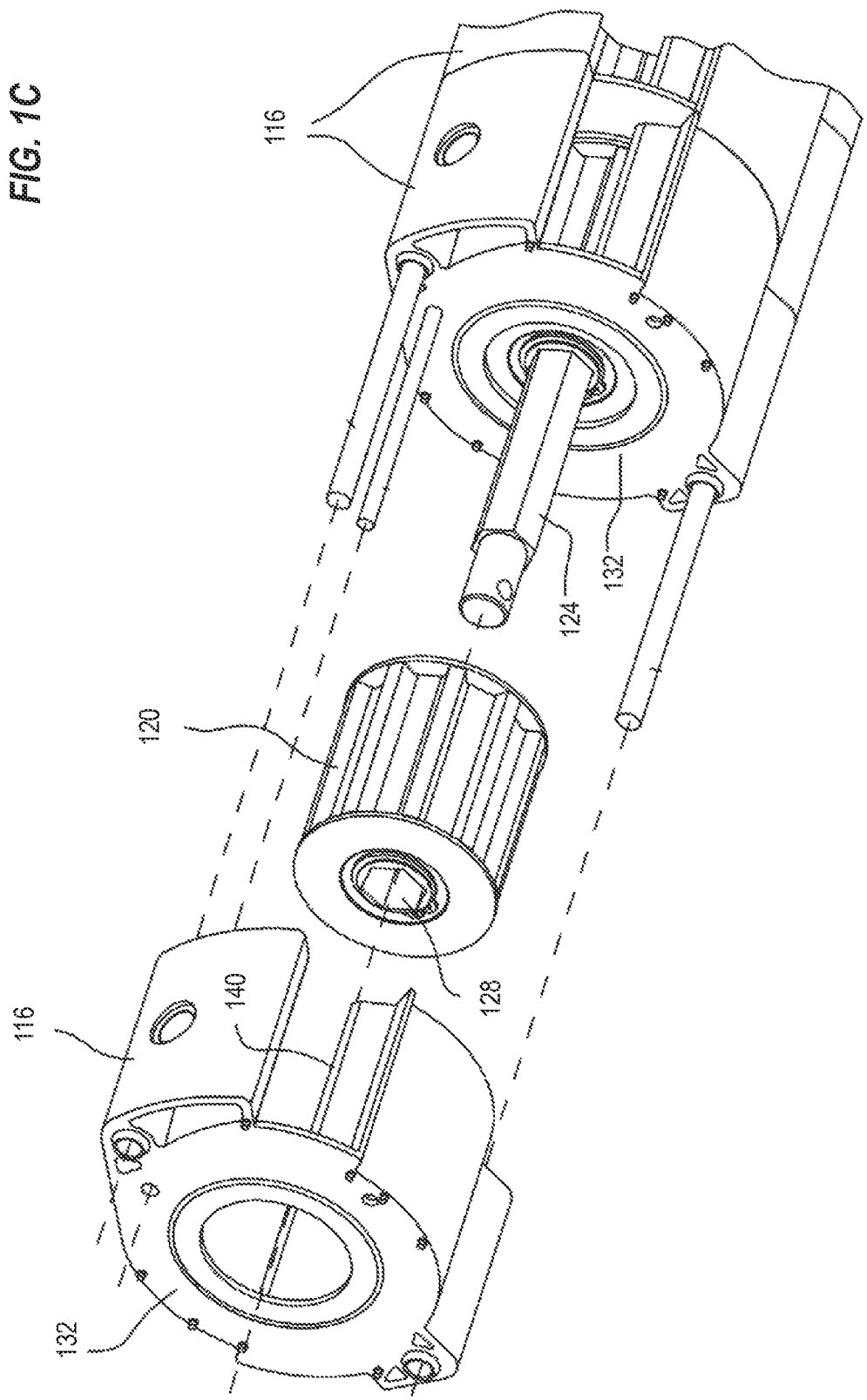

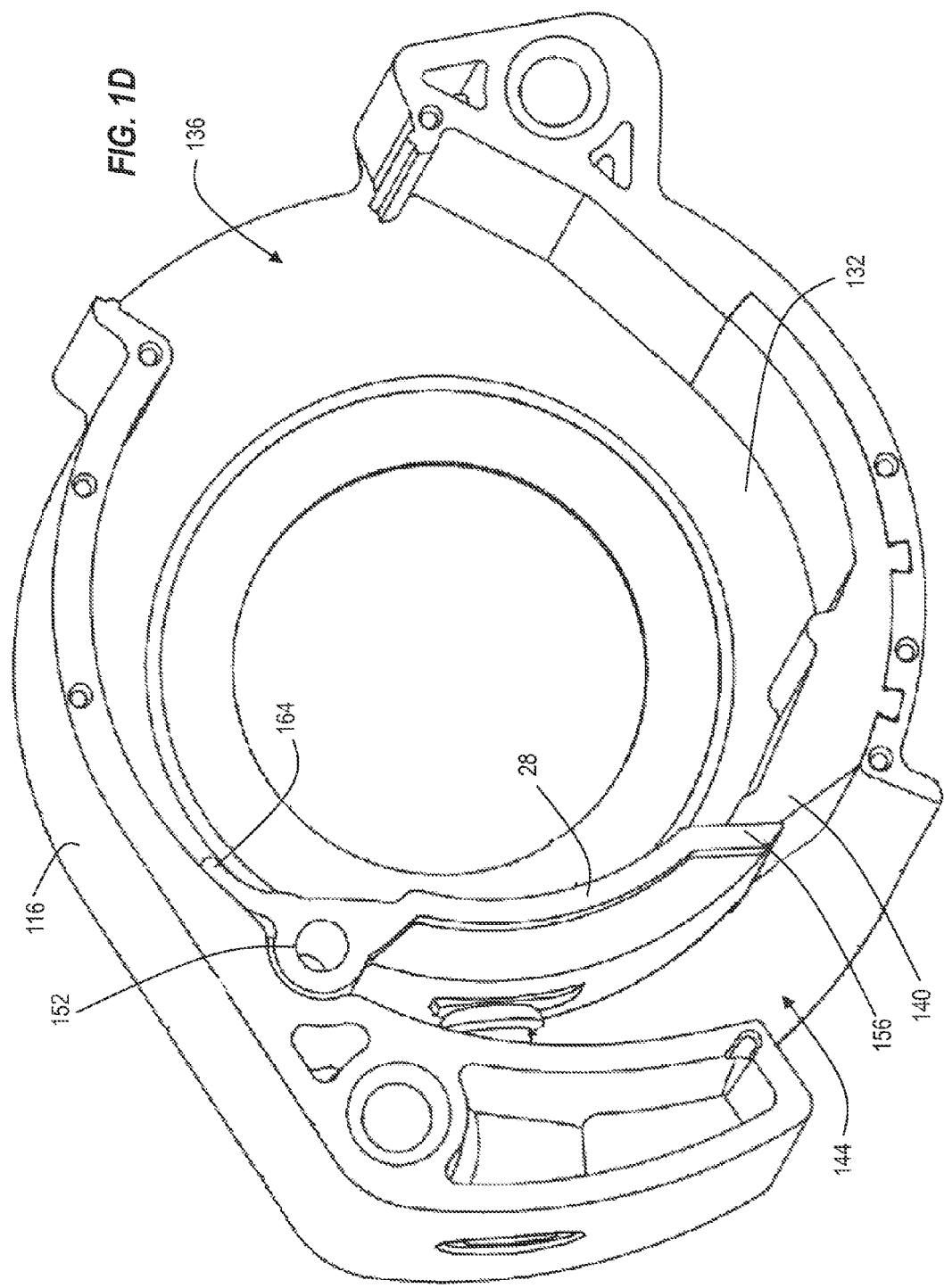

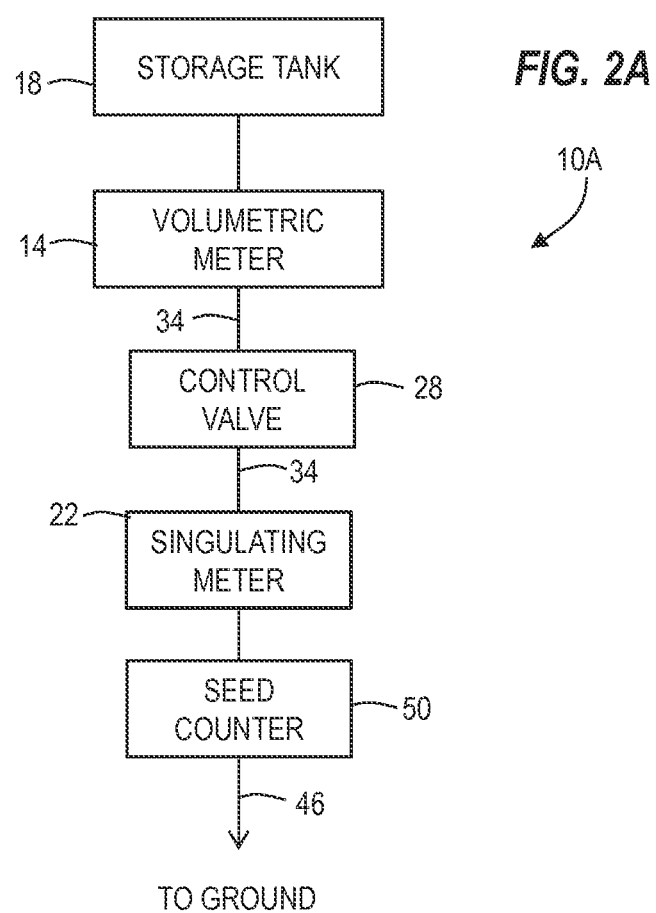

SYSTEM AND METHOD OF DISTRIBUTING SEEDS AND AGRICULTURAL PARTICLES

BACKGROUND

The present disclosure relates to a seeding system and more particularly to a seed metering and distribution system of the seeding system.

SUMMARY

Current seeding practices tend to involve one of two types of seeding systems: planters and air seeders. Planters generally singulate or individually meter seeds prior to planting and are generally used to disperse seeds where precise placement is required for maximum yield and the seeding rate permits use of singulating technologies. Air seeders generally meter seeds volumetrically and are generally used in high rate seeding applications and where precise seed placement is of less importance or not practical due to the high rates.

A system for distributing a plurality of seeds includes a storage tank operable to store the plurality of seeds. A first meter is downstream of the storage tank. A second meter is downstream of the first meter and is operable to individually meter the plurality of seeds. An outlet conduit is located downstream of the second meter. The first meter is configured to adjust the flow of the plurality of seeds in response to a signal from a sensor located between the first meter and the outlet conduit.

A distribution system for dispensing a plurality of seeds includes a storage tank operable to store the plurality of seeds. The distribution system also includes a volumetric meter. A singulating meter is downstream of the volumetric meter and is operable to singulate the plurality of seeds. One or more sensors are disposed downstream of the volumetric meter. The sensor is configured to provide a signal to adjust the flow of the plurality of seeds from the volumetric meter to the singulating meter.

A distribution system configured to distribute a plurality of seeds includes a storage tank capable of storing the plurality of seeds. A volumetric meter is configured to meter the plurality of seeds from the storage tank into a main conduit at a first rate. A singulating meter is configured to meter the plurality of seeds at a second rate less than the first rate. A hopper is located between the volumetric meter and the singulating meter and is configured to accumulate the plurality of seeds to a first predetermined level. A control valve is located upstream of the hopper. When the plurality of seeds accumulates to the first predetermined level, the control valve adjusts to provide the plurality of seeds to the singulating meter at a third rate less than the second rate.

Other features and aspects of the disclosure will become apparent by consideration of the following detailed description and accompanying drawings.

BRIEF DESCRIPTION OF THE DRAWINGS

FIG. 1A is a side view of a seeder.

FIG. 1B is a perspective view of a seed meter of the seeder.

FIG. 1C is an exploded perspective view of a meter cartridge of the seed meter of FIG. 1B illustrating one casing and one roller segment separated from the cartridge.

FIG. 1D is a perspective view of a casing of the seed meter of FIG. 1B.

FIG. 2A is a schematic diagram illustrating a metering and seeding system.

Figure 2B:
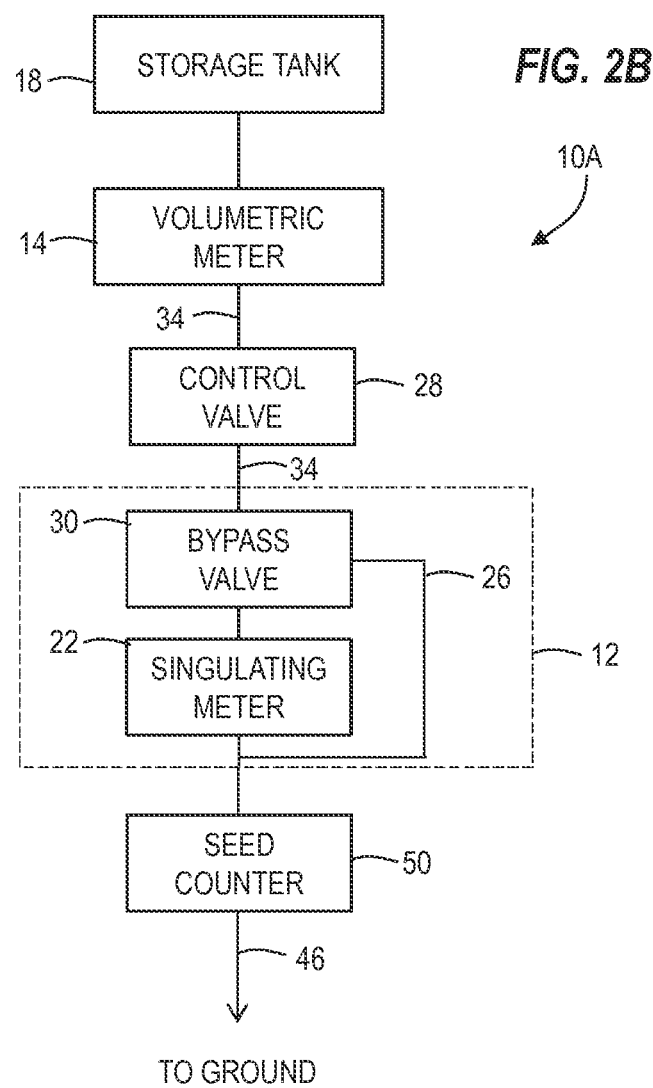
FIG. 2B is a schematic diagram illustrating further details of the metering and seeding system.

Before any embodiments of the disclosure are explained in detail, it is to be understood that the invention is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

As shown in FIG. 1A, seeding machine 2 comprises a seed cart 13 and a tilling implement 17. The seed cart 13 is typically towed by a tractor through a field to be seeded. The illustrated seed cart 13 has a frame supporting a number of storage tanks 18, with wheels 61 rotatably mounted to the frame. Each storage tank 18 is associated with a volumetric meter 14. Each volumetric meter 14 is positioned below the respective storage tank 18 and receives product therefrom for controlled feeding of the product into a pneumatic distribution system 21. The product contained in the storage tanks 18 may include seed, fertilizer or other agricultural particles.

The tilling implement 17, towed behind the seed cart 13 in the example shown in FIG. 1, comprises a frame to which ground openers 29 are mounted. The tilling implement 17 may also include seed row finishing equipment, such as packers 33. Located below each volumetric meter 14 is a primary air distribution manifold 25, part of the pneumatic distribution system 21. The pneumatic distribution system 21 distributes metered product from the storage tanks 18 to the ground openers 29, and comprises a blower 37 driven by a motor which directs a stream of pressurized air through an adjustable damper 41, which thereafter directs the air stream into a top rank portion of first tubes 45 and a bottom rank portion of first tubes 49. FIG. 1A illustrates a double shoot air seeder wherein a first product contained in one of the storage tanks 18 is directed to the top rank portion 45 of the system 21 and a second product contained in the other of the storage tanks 18 is directed to the bottom rank portion 49 of the system 21. The primary air distribution manifolds 25 may be configured to place product from both tanks 18 into the same rank of tubes for single shoot operation.

Referring to FIG. 1B, the volumetric meter, or seed meter, 14 is shown with a cartridge 108 partially withdrawn from the seed meter housing 100. The cartridge 108 consists of a plurality of casings 116 placed adjacent to one another and fastened together.

Referring to FIG. 1C, a meter roller of the seed meter 14 is constructed of a plurality of roller segments 120 axially positioned along a drive shaft 124. In the embodiment shown, the drive shaft 124 is hex shaped to mate with the hex shaped bore 128 in the roller segments 120. Each roller segment 120 is disposed within a separate casing 116. Referring also to FIG. 1D, each casing 116 has a radial wall 132 along one axial end that separates adjacent roller segments from one another axially along the shaft 124. Each casing 116 also defines an inlet 136 in communication with the inlet passage 104 of the meter housing 100 for receiving product therefrom (FIG. 1B). In operation, product is displaced by the teeth and grooves of the rollers 120, over a ledge 140 to an outlet 144 in the casing 116. From there product flows to the manifold 25 of the distribution system 21 (FIG. 1A).

For each casing 116, a control valve or shut-off gate 28 is provided to selectively shut-off the flow of seed from a given section of the meter roller. In FIG. 1D, the gate 28 is shown in the closed position in which a distal end 156 of the gate 28 bears against or is adjacent the ledge 140 to prevent product from flowing over the ledge. The gate 28 is integrally formed with a spring tab 164 extending upward from the pivot 152. When the gate 28 is in the closed position, the spring tab 164 is deflected. When an actuator 160 (FIG. 1B) is retracted, the spring tab 164 provides a biasing force to move the gate 28 to the open position.

In the open position, spaced from the ledge 140, the gate 28 allows product to flow to the outlet 144. The spring tab 164 bears against an inner surface of the casing 116 in the closed position. Separate spring members can be used between the gate and the casing member to bias the gate 28 to the open position in place of the integral spring tab 164. These could include a tension spring between the gate 28 and casing 116 near the distal end 156 of the gate or a coil spring at the pivot 152. Each roller segment 120 in the seed meter 14 controls the flow of product into one of the tubes 45 or 49.

FIGS. 2A-6 schematically illustrate seed metering systems 10A-10E along a single rank portion 45, 49 for use in a planting operation, such as seeding a field or dispersing agricultural particles (e.g., fertilizer, etc.). Throughout this application, when referring to seeds or seeding, it is understood that one skilled in the art could equally apply some portions or all of the seed metering system 10A-10E to agricultural particles and the dispersing of the agricultural particles. The seed metering systems 10A-10E can be used with or as a part of the seeding machine 2.

Each volumetric meter 14 (e.g., one volumetric meter 14 associated with each storage tank 18) receives and meters the seeds or agricultural particles from a storage tank 18 in the form of a tank, hopper, air cart, mobile seed storage device, or other bulk container as previously described and illustrated in FIG. 1A. The volumetric meter 14, a first meter, controls the amount or volume of seeds permitted to exit the storage tank 18 over a set period of time, and with the rotating member 120, which is capable of rotating at a desired rotational velocity, carries a known, constant volume of seeds from an inlet side to an outlet side and deposits the seeds in a main conduit 34, which leads to a singulating meter 22. Each main conduit 34 corresponds to one of the top or bottom tubes 45 or 49. While each of the top and bottom tubes 45, 49 may lead to singulating meters 22, it is more common that only one rank of tubes, for example, only the top rank of tubes 45, will lead to singulating meters 22.

The singulating meter 22, a second meter, is part of a subassembly 12 (FIGS. 1 and 2A). The singulating meter 22 is aligned with the appropriate rank portion 45, 49 (FIG. 1A) and receives the seeds from the associated volumetric meter 14. In operation, the singulating meter 22 singulates or individually meters the seeds prior to planting the seeds in the ground. The singulating meter 22 may include a rotating singulating disk (not shown) with multiple orifices, each sized to accept a single seed, and a doubles eliminator (not shown) provided to ensure a one-to-one ratio of seed to each aperture.

In an alternative embodiment illustrated in FIG. 2B, the subassembly 12 includes an integrated control valve 30 for circumnavigating the singulating meter 22 and a bypass conduit 26. When it is not desired to singulate seed with the meter 22, the bypass valve or control valve 30 is configured to direct seed to the bypass conduit 26 to avoid singulation in the meter 22.

A control valve 28 is provided for each individual metering roller of the volumetric meter 14, upstream of the singulating meter 22 and may be located between the volumetric meter 14 and the singulating meter 22. In some embodiments, the control valve 28 may be adjacent the volumetric meter 14 to selectively open or close the outlet of the volumetric meter 14 (see FIG. 1D). The control valve 28 may be switched between the fully open position and the fully closed position with no intermediate positions. When in the open position, the control valve 28 allows seed to travel from the volumetric meter 14 to the singulating meter 22. The ratio of the time the valve 28 is open to the time the valve 28 is closed will determine the rate of seed delivery to the singulating meter 22. The control valve 28 may be actuated by an electrical, mechanical, or hydraulic input to the closing mechanism. In some constructions, it may be possible to provide the control valve 28 with positions intermediate the fully closed and fully open positions to vary the flow rate from the volumetric meter.

At the outlet of the singulating meter 22, an outlet conduit 46 provides a path for the singulated seeds to reach the ground. The outlet conduit 46 may be in the form of a tube, hollow shaft, channel, belt, or similar means of conveyance suitable to transfer seed, fertilizer, or other agricultural particles to the ground. More specifically, the outlet conduit 46 may deposit or plant the seeds in a furrow created by the ground openers 29. If the singulating meter 22 includes a bypass 26 (FIG. 2B), the outlet conduit 46 may be a common outlet for both the singulating meter 22 and the bypass 26, and this outlet conduit 46 may include one common seed sensor 50. The seed sensor 50 measures the number of seeds or rate of seeding (i.e., number of seeds per time increment) from the singulating meter 22 and the bypass 26, if used. This information can be stored and relayed from a control unit to an operator for monitoring purposes, data collection for later analysis, etc.

In an alternative arrangement of the volumetric meter 14, each metering roller segment 120 may be driven independently by a motor, etc. In such a case, the control valve 28 is not needed to regulate the flow of seed to the singulating meter 22. Rather, the independent control of the meter roller drive motors can be used to independently control the rate at which seed is delivered to the singulating meter 22. The speed of the meter drive motor may be changed or it may be turned on and off periodically to provide the desired rate of seed. Therefore, the control valve 28 of any of the embodiments of FIGS. 3-6 is not necessary.

Figure 3:
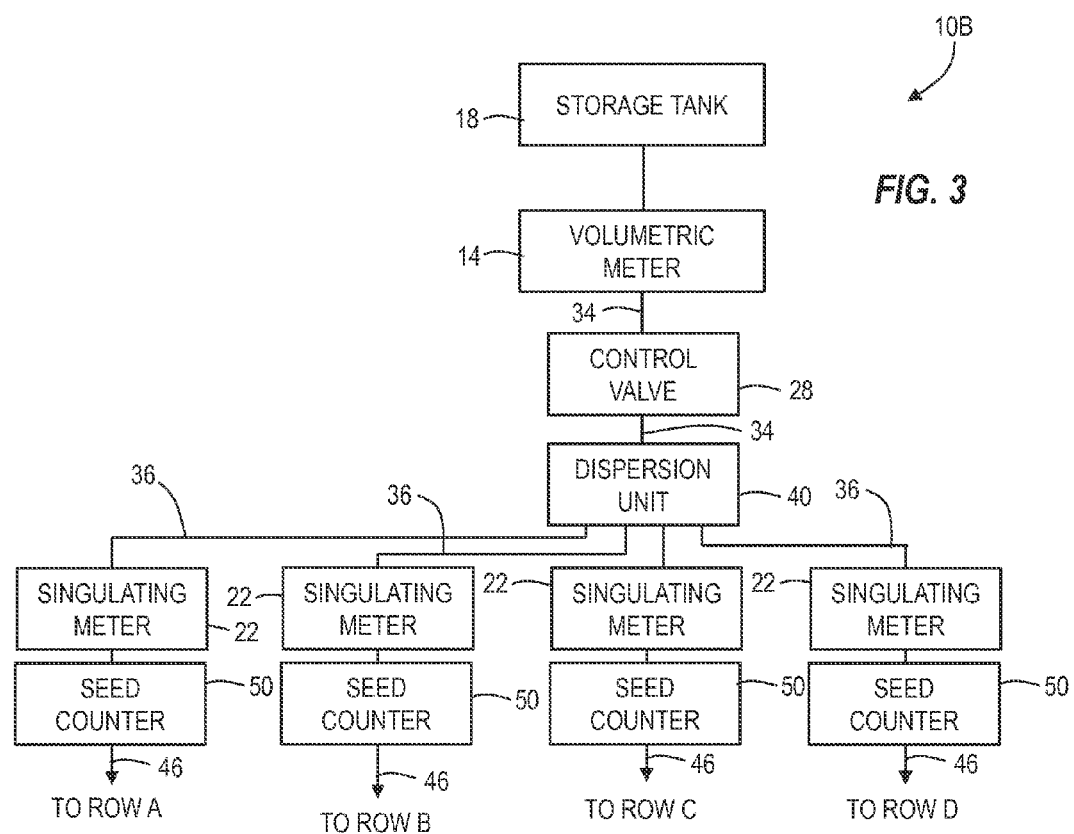
FIG. 3 is a schematic diagram illustrating still further details of the metering and seeding system.

Referring to FIG. 3, which further illustrates the system 10A of FIG. 2A applied to multiple rows, a distribution or dispersion unit 40 is positioned between the volumetric meter 14 and the singulating meter 22, or, more particularly, between the control valve 28 and the singulating meter 22. The main conduit 34 from a single metering roller segment 120 of the volumetric meter 14 terminates at the dispersion unit 40. The dispersion unit 40 includes a common inlet and a plurality of outlets, each of which feeds one of a number of secondary conduits 36. As shown in FIG. 3, each secondary conduit 36 connects the dispersion unit 40 to a singulating meter 22, typically, one singulating meter 22 associated with each secondary conduit 36. However, a flow splitter may be used in a secondary conduit 36 to supply seed to two singulating meters 22 from one secondary conduit 36. Each seed meter 22 can be associated with an individual seed sensor 50, outlet conduit 46, and, optionally a bypass conduit 26 as described with reference to FIG. 2B above. If a one-to-one relationship exists between the number of volumetric meter 14 rollers and the number of singulating meters 22, a dispersion unit 40 may not be necessary.

Figure 4:
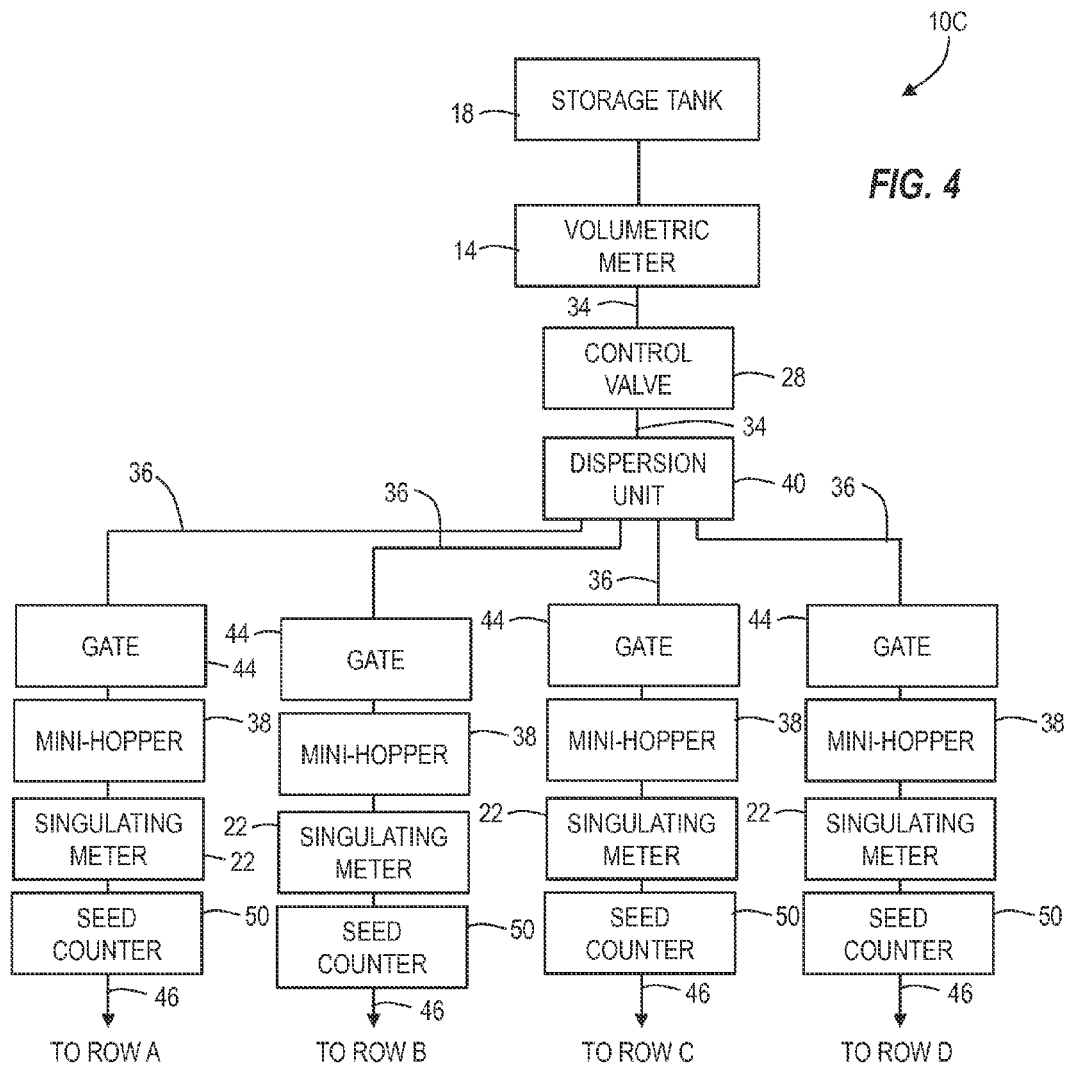
FIG. 4 is a schematic diagram illustrating still further details of the metering and seeding system.

As shown in FIG. 4, which illustrates the metering and distribution system in greater detail, a container or hopper or "mini-hopper" 38 is associated with or a component of each singulating meter 22. The mini-hopper 38 is positioned directly upstream of the singulating meter 22 and passes seeds from the associated secondary conduit 36, through an inlet of the mini-hopper, through an outlet of the mini-hopper, and into the meter 22. The mini-hopper 38 is additionally capable of storing excess seeds, not yet metered by the singulating meter 22. For a portion of time, therefore, seeds may pass through the volumetric meter 14 at a greater rate than the seeds are singulated. This ensures that the singulating meter 22 is consistently supplied with seeds for singulating and subsequent planting.

Referring again to FIG. 4, each secondary conduit 36 may include a gate 44 located upstream of the singulating meter 22 and upstream of or at the mini-hopper 38. If present, each gate 44 serves a similar function to the control valve 28 but operates individually, in each secondary conduit 36. As a result, each gate 44 is capable of blocking access through the secondary conduit 36 via a closing mechanism (not shown) or, alternatively, allowing an open passage for the seeds from the dispersion unit 40 to pass to the singulating meter. Similar to the control valve 28, the gate 44 may be actuated by an electrical, mechanical, or hydraulic input to the closing mechanism.

Figure 5:
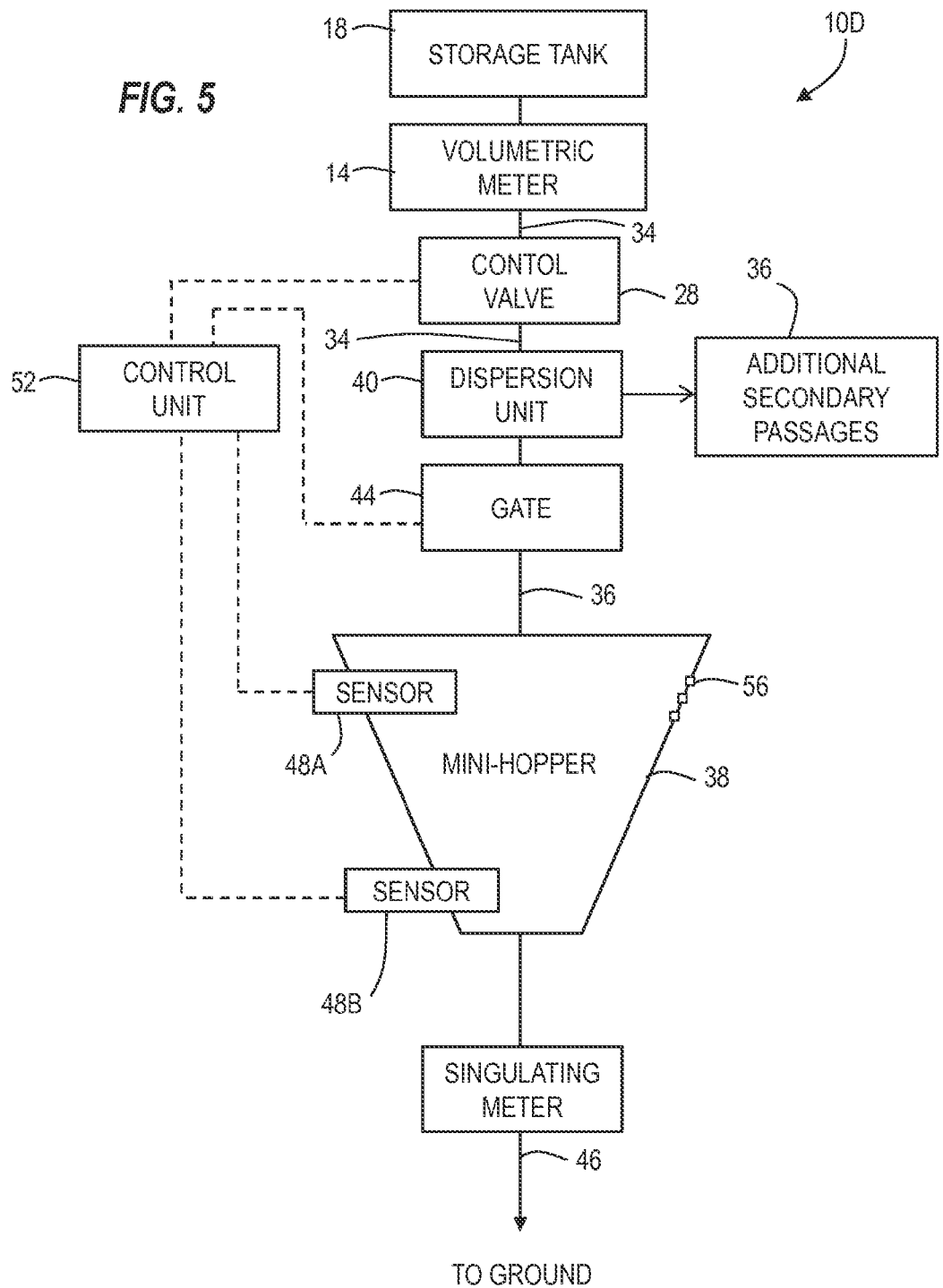
FIG. 5 is a schematic diagram illustrating the metering system of FIGS. 2-4 with a first control system.

As shown in FIG. 5, the mini-hopper 38 may be equipped with one or more sensors. As shown, the illustrated mini-hopper 38 has two sensors: a high-level sensor 48A and a low-level sensor 48B. The sensors 48A, 48B may be mechanical or electrical/electronic in nature and based on, for example, pressure, optics, ultrasound, etc. The high-level sensor 48A communicates with a control unit 52 (i.e., provides a HIGH-LEVEL signal) to communicate when the mini-hopper 38 has reached or filled above a predetermined upper limit. The low-level sensor 48B communicates with the control unit 52 (i.e., provides a LOW-LEVEL signal) to communicate when the mini-hopper 38 has reached or drained below a predetermined lower limit. Alternatively, a continuous sensor may be configured to measure the level of seeds within the hopper at all levels within a predetermined range (e.g., between the predetermined upper limit and the predetermined lower limit). Together, the sensors 48A, 48B form a system capable of providing inputs to the control unit 52 to maintain the seed level within the mini-hopper 38 between the high and low levels. The control unit 52 is operable to receive input from the sensors 48A, 48B, and, through electrical communication, provides signals to control (e.g., open, close, etc.) the control valve 28. Alternatively, the control unit 52 may be in communication with the gate 44 associated with the appropriate mini-hopper 38 and operable to provide signals to control the gate 44. If the gates 44 are controlled with the signals from the sensors 48A, 48B, the additional secondary conduits 36 can be controlled independently of one another. In yet another alternative, if the volumetric meter 14 includes individually driven meter roller segments or has other such seed flow control, the control valve 28 is not needed and the control unit 52 can control the meter roller drive motor to control the flow rate of seed to the dispersion unit 40.

In some embodiments, the mini-hopper 38 is provided with one or more apertures 56 (see FIG. 6), distinct from the mini-hopper inlet and outlet, at or adjacent a maximum fill height. When not blocked by seeds, the aperture(s) 56 provide an outlet for air conveying seed into the mini-hopper 38, but are sized to prevent seeds from passing therethrough. When the aperture(s) 56 are blocked, the air outlet is effectively closed or constricted, preventing the flow of air through the associate secondary conduit 36. When the air ceases to flow through the conduit 36, seed also ceases to flow from the dispersion unit 40 to the mini-hopper 38. The seed at the dispersion unit 40 will then be divided among the remaining conduits 36 that have air flowing therethrough. Once seed in the mini-hopper 38 is consumed sufficiently for the aperture(s) 56 to be clear, air flow resumes, and more seed is delivered to the mini-hopper 38. Because the aperture(s) 56 create a passive regulation of air flow from the dispersion unit 40 to the mini-hopper 38, the gate 44 may be optional. Also, the aperture(s) 56 can be provided in addition to or in place of either or both sensors 48A, 48B descried above.

In another embodiment (as an example FIG. 6), a passage sensor 48C may be located outside of the mini-hopper 38, in proximity to the main conduit 34, the secondary conduit 36, or the mini-hopper 38, and may function in place of the first system of sensors 48A, 48B. If the passage sensor 48C is located adjacent the main conduit 34, only a single passage sensor 48C is necessary for the seed metering system 10E (e.g., for each tube of the top or bottom rank portion). If the passage sensor 48C is located adjacent the secondary conduits 36 or the mini-hoppers 38 in contrast, the seed metering system 10E may require one passage sensor 48C per secondary conduit 36. The passage sensor 48C can be a pressure or velocity sensor capable of measuring the flow of passing air and seeds.

For example, when the apertures 56 are blocked in one or more of the mini-hoppers 38 associated with a given dispersion unit 40, the pressure and/or velocity of seed in the main conduit 34 will change. This change will be detected by the passage sensor 48C. The magnitude of the change will indicate the number of mini-hoppers that are full. The control unit 52 can then adjust the seed flow rate, either with the control valve 28 or with the meter drive motor if the volumetric meter has independently driven meter rollers or can otherwise be controlled as discussed above. In a first mode of metering, as shown in FIG. 5, the storage tank 18 holds a number of seeds. The volumetric meter 14 permits a known amount of seeds to exit the storage tank 18 at a fixed rate. With no HIGH-LEVEL signal received from the high-level sensor 48A in the mini-hopper 38, the control valve 28 does not hinder the flow of the seeds through the main conduit 34. From the main conduit 34, the seeds continue to the dispersion unit 40. From the dispersion unit 40, the seeds pass into the secondary conduits 36, past gates 44 (i.e., one gate 44 associated with each secondary conduit 36), to the mini-hopper 38. From the mini-hopper 38, seeds are carried to the singulating meter 22 to be individually metered and planted via the outlet conduit 46. The seed-inflow rate to the mini-hopper 38 may be approximately equivalent to the outflow rate of the volumetric meter 14 divided amongst the number of secondary conduits 36.

The secondary conduit 36, which receives volumetrically metered seeds, may supply the mini-hopper 38 and singulating meter 22 with seeds at a greater rate than the singulating meter 22 is configured to singulate. Therefore, with a greater seed-inflow rate to the mini-hopper 38 than the seed-outflow rate through the singulating meter 22, the mini-hopper 38 accumulates seeds. When the seeds reach the high-level sensor 48A, the control unit 52 receives the HIGH-LEVEL signal, and signals the control valve 28 to close temporarily, thereby reducing the quantity of seeds transferred from the storage tank 18 to the mini-hopper 38 (i.e., such that the inlet rate to the singulating meter 22 is less than the outlet rate from the singulating meter 22). Alternatively, the control unit 52 may close or constrict the gate 44 associated with the appropriate secondary conduit 36, accomplishing a similar result.

If the seed-inflow rate to the mini-hopper 38 drops below the seed-outflow rate from the singulating meter 22, the mini-hopper 38 no longer accumulates seeds, and the level of seeds within the mini-hopper 38 decreases. When the level of seeds reaches at or below the low-level sensor 48B, the control unit receives the LOW-LEVEL signal, and signals the control valve 28 to remain open or the gate 44 to open, thereby allowing more seed throughput to the mini-hopper 38. Again, if the meter roller segments 120 are independently controlled or if the volumetric meter 14 is otherwise independently controlled, the flow of seed can be adjusted (e.g., through the speed of the roller or modulating between running and stopping the drive motor).

Figure 6:
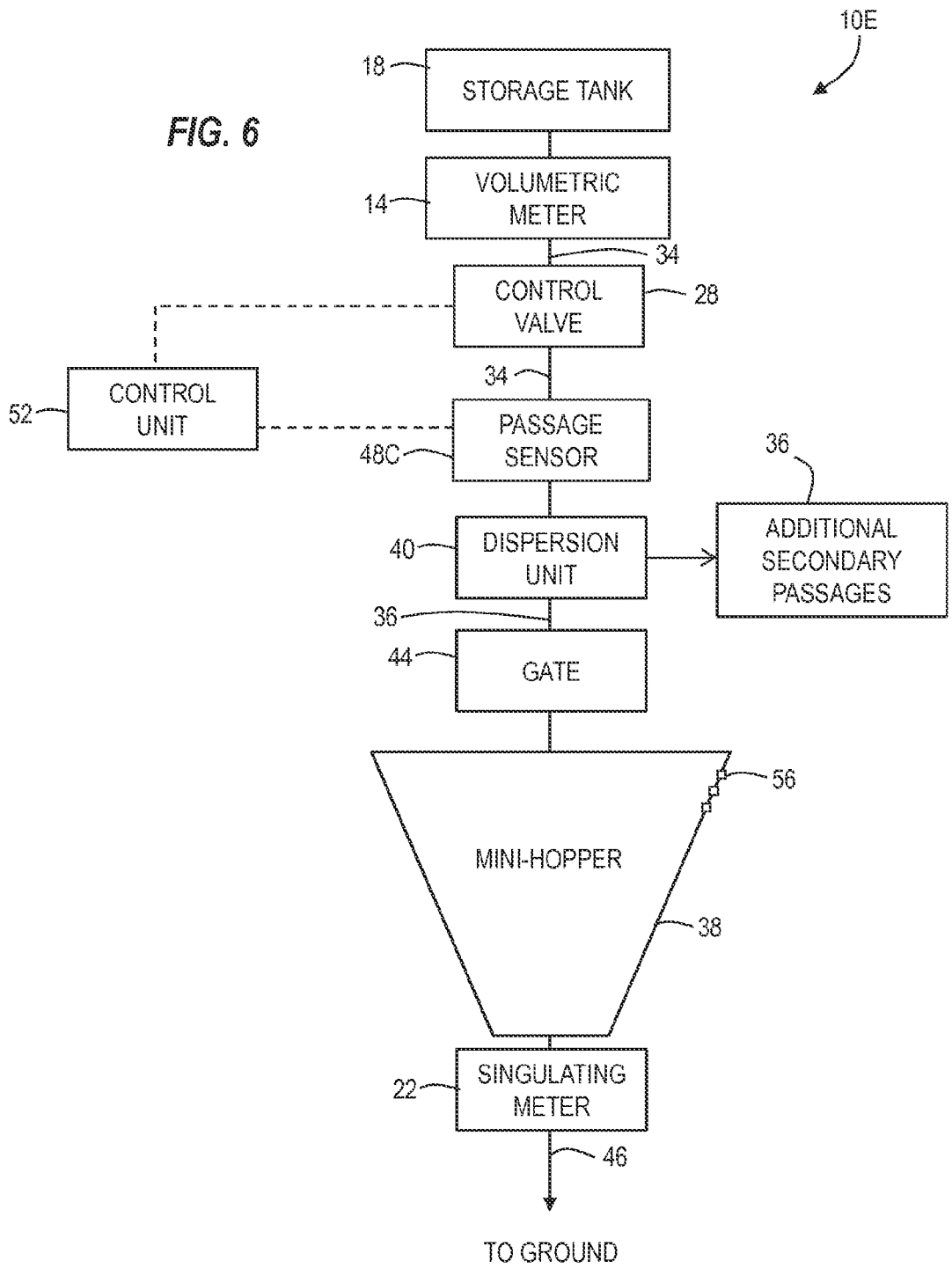
FIG. 6 is a schematic diagram illustrating the metering system of FIGS. 2-4 with a second control system.

In a second mode of metering, as shown in FIG. 6, the volumetric meter 14 again permits a known amount of seeds to exit the storage tank at a known rate. The passage sensor 48C records a seed or air velocity within the passage 34 or the pressure within the passage 34. When the mini-hopper 38 reaches the maximum fill height, the apertures 56 within the mini-hopper 38 are blocked by the seeds. In turn, the air within the main passage 34 and the associated secondary passage 36 is unable to vent through the apertures 56, thereby affecting the air pressure and/or velocity determined by the passage sensor 48C. The passage sensor 48C communicates the change in velocity or pressure to the control unit 52 and the control unit 52 actuates the control valve 28 to close thereby reducing the rate of seeds transferred from the storage tank 18 to the mini-hopper 38 (i.e., the inlet rate to the singulating meter 22 is less than the outlet rate of the singulating meter 22).

If the seed-inflow rate to the mini-hopper 38 drops below the seed-outflow rate through the singulating meter 22, the mini-hopper 38 no longer accumulates seeds, and the level of seeds within the mini-hopper 38 decreases. As the level of seeds decreases, the apertures 56 clear, allowing air to vent, increasing air velocity or decreasing pressure at the passage sensor 48C. In response to the change, the control unit 52 communicates a signal to the control valve 28 to open, thereby allowing more seeds to pass the mini-hopper 38. Once again, if the volumetric meter 14 can be independently driven (e.g., has independently driven meter roller segments 120), the control unit 52 may directly control the speed or operation of the volumetric meter 14 (e.g., through the meter roller drive motor) to control the seed flow rate.

In addition to responding to the first system of sensors 48A, 48B (FIG. 5) or the passage sensor 48C (FIG. 6), the control unit 52 may additionally be in communication with the bypass valve 30 (FIG. 2B) such that if the singulating meter 22 is bypassed via the bypass conduit 26, the control valve 28 and gate 44 need not be controlled in response to sensor output from the sensors 48A, 48B, 48C. The functionality of the sensors 48A, 48B and sensor 48C is dependent upon the level of seeds within the mini-hopper 38. When the singulating meter 22 is bypassed, the mini-hopper 38 is likewise bypassed. Therefore, sensor output may be disregarded when the singulating meter is bypassed.

Various features of the disclosure are set forth in the following claims.

What is claimed is:

1. A system for distributing a plurality of seeds, the system comprising:
   a storage tank operable to store the plurality of seeds;
   a first meter downstream of the storage tank;
   a second meter downstream of the first meter operable to individually meter the plurality of seeds; and
   an outlet conduit located downstream of the second meter;
   wherein the first meter is configured to adjust the flow of the plurality of seeds in response to a signal from a sensor located between the first meter and the outlet conduit,
   wherein the second meter is one of a plurality of second meters, the system further comprising a dispersion unit located between the first meter and the plurality of second meters and operable to concurrently disperse the plurality of seeds to at least two meters of the plurality of second meters, and
   wherein each meter of the plurality of second meters is operable to feed a separate outlet conduit for seeding a separate furrow.

2. The system of claim 1, wherein the first meter is a volumetric meter and each meter of the plurality of second meters is a singulating meter.

3. The system of claim 1, wherein the first meter further comprises a plurality of control valves, one control valve of the plurality of control valves arranged upstream of each meter of the plurality of second meters, wherein the control valve is operable to adjust the flow of the plurality of seeds from the first meter to the respective meter of the plurality of second meters.

4. The system of claim 3, wherein the control valve is operable in response to an output of one or more sensors located between the first meter and the respective meter of the plurality of second meters.

5. The system of claim 4, further comprising a hopper downstream of the first meter, wherein the one or more sensors are configured to measure the level of the plurality of seeds in the hopper.

6. The system of claim 4, wherein the one or more sensors are a pressure sensor or a velocity sensor.

7. The system of claim 6, further comprising a hopper downstream of the first meter and having an inlet, an outlet, and a number of apertures configured to function as an air outlet, distinct from the inlet and the outlet.

8. The system of claim 1, further comprising:
   a main conduit; and
   a plurality of secondary conduits;
   wherein the dispersion unit connects the main conduit with each conduit of the plurality of secondary conduits, and
   wherein the dispersion unit is operable to separate the plurality of seeds from the main conduit into the plurality of secondary conduits prior to the plurality of second meters.

9. A distribution system for dispensing a plurality of seeds, the distribution system comprising:
   a storage tank operable to store the plurality of seeds;
   a volumetric meter;

a singulating meter downstream of the volumetric meter operable to singulate the plurality of seeds; and one or more sensors disposed downstream of the volumetric meter, wherein the sensor is configured to provide a signal to adjust the flow of the plurality of seeds from the volumetric meter to the singulating meter, wherein the singulating meter is one of a plurality of singulating meters, the system further comprising a dispersion unit located between the volumetric meter and the plurality of singulating meters and operable to concurrently disperse the plurality of seeds to at least two meters of the plurality of singulating meters, wherein each meter of the plurality of singulating meters is operable to feed a separate outlet conduit for seeding a separate furrow.

10. The system of claim 9, further comprising a control valve, wherein the control valve is configured to adjust the flow of the plurality of seeds from the volumetric meter to an associated meter of the plurality of singulating meters in response to the signal from the one or more sensors.

11. The system of claim 9, further comprising a hopper downstream of the volumetric meter and upstream of each meter of the plurality of singulating meters, wherein the one or more sensors are configured to measure the level of the plurality of seeds in the hopper.

12. The system of claim 9, wherein the one or more sensors are a pressure sensor or a velocity sensor.

13. The system of claim 9, further comprising:

a main conduit; and a plurality of secondary conduits;

wherein the dispersion unit connects the main conduit with each conduit of the plurality of secondary conduits, and wherein the dispersion unit is operable to separate the plurality of seeds from the main conduit into the plurality of secondary conduits prior to the plurality of singulating meters.

14. A distribution system configured to distribute a plurality of seeds, the distribution system comprising:

a storage tank capable of storing the plurality of seeds;

a volumetric meter configured to meter the plurality of seeds from the storage tank into a main conduit at a first rate;

a singulating meter configured to meter the plurality of seeds at a second rate less than the first rate;

a hopper positioned between the volumetric meter and the singulating meter and configured to accumulate the plurality of seeds to a first predetermined level; and a control valve located upstream of the hopper, wherein, when the plurality of seeds accumulate to the first predetermined level, the control valve adjusts to provide the plurality of seeds to the singulating meter at a third rate less than the second rate, wherein the singulating meter is one of a plurality of singulating meters and further comprising a dispersion unit operable to concurrently disperse the plurality of seeds to at least two meters of the plurality of singulating meters, and wherein each meter of the plurality of singulating meters is operable to feed a separate outlet conduit for seeding a separate furrow.

15. The distribution system of claim 14, wherein, when the plurality of seeds within the hopper dissipates to a second predetermined level, the control valve adjusts to provide the plurality of seeds to one meter of the plurality of singulating meters at the first rate.

16. The distribution system of claim 14, further comprising a high-level sensor located within the hopper at the first predetermined level and a low-level sensor located within the hopper at the second predetermined level.

17. The distribution system of claim 14, further comprising a continuous sensor configured to measure the level of seeds within the hopper at all levels within a predetermined range.

18. The distribution system of claim 14, further comprising a pressure or velocity sensor configured to measure the air flow through the distribution system.

* * * * *